(12) United States Patent
Pelkey et al.

(10) Patent No.: US 7,185,187 B2
(45) Date of Patent: Feb. 27, 2007

(54) PROTECTED DUAL PURPOSE POWER/ENTER SWITCH APPARATUS AND METHOD

(75) Inventors: Gary L. Pelkey, Woodstock, GA (US); Stanley L. Williams, Gainesville, GA (US)

(73) Assignee: Wegener Communications, Inc., Duluth, GA (US)

( * ) Notice: Subject to any disclaimer, the term of this patent is extended or adjusted under 35 U.S.C. 154(b) by 622 days.

(21) Appl. No.: 10/659,991

(22) Filed: Sep. 11, 2003

(65) Prior Publication Data

US 2005/0068088 A1    Mar. 31, 2005

(51) Int. Cl.
*G06F 9/00* (2006.01)
(52) U.S. Cl. .......... 713/1; 713/323; 713/330; 307/141; 700/286; 714/24
(58) Field of Classification Search .......... 713/1, 713/323, 330; 307/141; 700/286; 714/24
See application file for complete search history.

(56) References Cited

U.S. PATENT DOCUMENTS

| | | | |
|---|---|---|---|
| 5,410,326 A | | 4/1995 | Goldstein |
| 5,657,414 A | | 8/1997 | Lett et al. |
| 5,751,950 A | * | 5/1998 | Crisan .......... 726/36 |
| 5,761,406 A | * | 6/1998 | Kobayashi et al. .......... 714/24 |
| 5,815,409 A | * | 9/1998 | Lee et al. .......... 700/286 |
| 5,903,766 A | * | 5/1999 | Walker et al. .......... 713/323 |
| 5,918,059 A | * | 6/1999 | Tavallaei et al. .......... 713/300 |
| 5,936,660 A | | 8/1999 | Gurantz |
| 6,115,824 A | * | 9/2000 | Ha .......... 713/330 |
| 6,359,636 B1 | | 3/2002 | Schindler et al. |
| 6,430,223 B1 | | 8/2002 | Lim |
| 6,467,093 B1 | | 10/2002 | Inoue et al. |
| 6,487,589 B1 | | 11/2002 | Yoshino et al. |
| 6,493,876 B1 | | 12/2002 | DeFreese et al. |
| 6,516,467 B1 | | 2/2003 | Schindler et al. |
| 2001/0021997 A1 | | 9/2001 | Lee |
| 2002/0007485 A1 | | 1/2002 | Rodriguez et al. |
| 2002/0095689 A1 | | 7/2002 | Novak |
| 2002/0108126 A1 | | 8/2002 | Horowitz et al. |
| 2002/0129364 A1 | | 9/2002 | Smith et al. |
| 2003/0005439 A1 | | 1/2003 | Rovira |
| 2003/0014767 A1 | | 1/2003 | Stumphauzer, II |
| 2003/0046708 A1 | | 3/2003 | Jutzi |
| 2003/0106064 A1 | | 6/2003 | Plourde, Jr. |
| 2003/0110511 A1 | | 6/2003 | Schutte et al. |
| 2003/0111911 A1 | * | 6/2003 | Hsu .......... 307/141 |
| 2003/0154475 A1 | | 8/2003 | Rodriguez et al. |
| 2003/0154492 A1 | | 8/2003 | Falvo et al. |
| 2003/0163821 A1 | | 8/2003 | Knutson et al. |

* cited by examiner

*Primary Examiner*—Thomas Lee
*Assistant Examiner*—Sean Weinman
(74) *Attorney, Agent, or Firm*—Husch & Eppenberger LLC; Robert C. Haldiman

(57) ABSTRACT

A protected dual purpose power/enter switch for an integrated receiver/decoder has a first relay and a second relay adapted for operative communication with a motherboard and with each other. A switch and a processor are in operative communication with the first relay. When the device is off, said switch is configured to activate the first and second relay to power up the device, and when said device is on, the first relay connects the switch to the processor as an enter switch. The switch may power off said device by entering a power off menu item displayed by said processor.

16 Claims, 6 Drawing Sheets

PROTECTED DUAL PURPOSE POWER/ENTER SWITCH APPARATUS AND METHOD

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

The present invention is in the field of receivers and decoders for broadcast transmissions of data such as audio-visual data.

2. Related Art

Hardware for the receipt of data transmissions such as audio and video increasingly receive the data in higher volumes and at faster speeds. This is particularly true of broadcast transmissions of audio and video data such as that transmitted according to MPEG protocols, and by streaming audio and video. Accordingly, the consequences of any inadvertent power shut down and resulting interruption of service becomes increasingly burdensome. The detrimental effect of such an interruption in services multiplies when the receiver/decoder equipment in question serves multiple end users, as for example, an integrated receiver decoder operated by a cable television service with many subscribers. Locating power switches on the rear of the hardware unit to prevent accidental shut down is cumbersome and inconvenient. There is a need in the field of high volume data transmission and processing hardware for a protected power switch that helps prevent mistaken shut downs.

Additionally, it is advantageous to conserve space on an operator interface panel for such hardware. Accordingly, it is desirable to construct buttons that may be used for dual purposes.

SUMMARY OF THE INVENTION

It is in light of the stated problems and needs that the present invention was developed. The present invention is a dual purpose, power protected switch for data receiving and processing hardware such as an integrated receiver decoder for receipt of broadcast digital data transmission.

In one embodiment, the apparatus of the invention is comprised of a switch, two relays, and a microprocessor all of which are adapted to interact with a motherboard for any device, particularly an integrated receiver decoder for digital data transmission. When the device is off, a first relay maintains a connection between the switch and a second relay and keeps the switch disconnected from the processor. Thus, when the device is off, pressing the button or switch directly activates the second relay, which is a power relay, to turn on the device, or more particularly the motherboard within the device.

When the device is powered up, its microprocesor engages the relay, which may be considered to be a first or control relay, energizing it in order to change the connection of the switch. Upon power up, the switch is disconnected from the second, power relay and connected to the microprocessor. The first relay will maintain this status for the switch for so long as the device is on.

When connected with the microprocessor, the signal sent by pushing the switch or the button will be received by the processor as an enter or selection signal. The microprocessor controls a LCD or other display for operator interface. The microprocessor is further connected with the motherboard or other computational components of the device such that menu items selected are forwarded to the motherboard of the device for execution.

One of the menu items that may be selected by pushing the button or switch is a power down or "off" selection. Power down is then executed by software control.

Further features and advantages of the present invention, as well as the structure and operation of various embodiments of the present invention, are described in detail below with reference to the accompanying drawings.

BRIEF DESCRIPTION OF THE DRAWINGS

FIG. 2 is a circuit diagram for the apparatus for the present invention when the device is being turned on.

FIG. 3 is a circuit diagram for the apparatus for the present invention when the device is on.

DETAILED DESCRIPTION OF THE PREFERRED EMBODIMENTS

Figure 1:
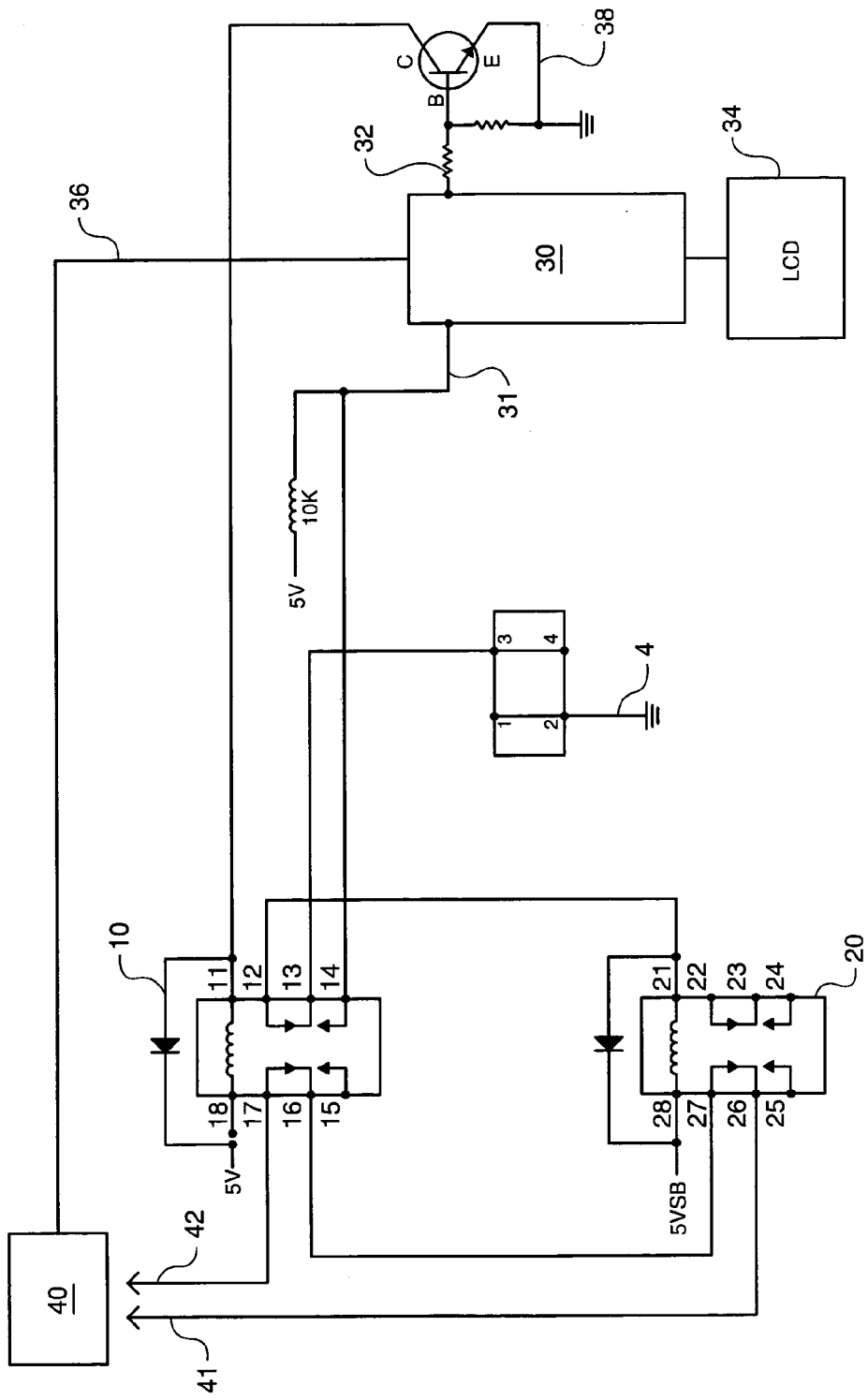
FIG. 1 is a circuit diagram for the apparatus for the present invention when the device is off.

Referring now to the drawings in which like reference numerals refer to like components, FIG. 1 is a circuit diagram for the apparatus of the present invention. A main or primary circuit board 40 commonly referred to as a "motherboard" will be powered on and powered off by the push button in its cooperating circuitry with the other components of the present invention. It is a typical feature in most motherboards to control a power supply. The control generally maintains the power supply in a non-generating state when the overall device and motherboard are off. A certain voltage, +5 in the depicted embodiment, is maintained when the unit is off as a standby power source.

A first relay 10 serves as a control relay. A second relay 20 serves as a power relay. Solid state components may be substituted for the relays described herein without departing from the scope of the present invention. Those of skill in the art will recognize that the functionality of solid state components is adequately represented in a clear graphical depiction by the relays shown in the figures.

A microprocessor 30 is programmed with firmware configured to operate a user interface, which may include any display, such as the LCD 34 depicted. Microprocessor 30 also has a direct connection to motherboard 40 through circuit 36.

In the depicted embodiment, the device is an integrated receiver-decoder for satellite broadcast of digitized data such as audio and video. However, the invention is applicable to any device containing a motherboard provided that the motherboard powers on and powers off according to a standard technique herein described. The motherboard type to which the present invention is adapted powers on from off, and also off from on, by a momentary but not continuous closure of its circuit across terminals 41 and 42. For a variety of reasons, motherboards maintain the power terminals with an open circuit when the PCs for which they are primarily designed are either off or on. They change the power status when the circuit is momentarily closed. The normally preconfigured "momentary" time is typically about 2 seconds. Holding the ordinary PC power button in maintains a closure for longer than the allotted time, and causes the motherboard to power down again and turn the device off. This time is typically four seconds or longer.

In many PCs, and in possible alternative embodiments of the present invention, the 'power up' terminals of the motherboard are maintained in an open state when the device is off. In the hereinafter depicted embodiments of the invention, the circuit is maintained in a closed state. In the depicted embodiment, in its inactive state, terminals 41 and 42 of motherboard 40 connect through the inactive closed circuit which proceeds through terminals 17 and 16 of relay 10 and terminals 27 and 26 of relay 20.

Figure 2:
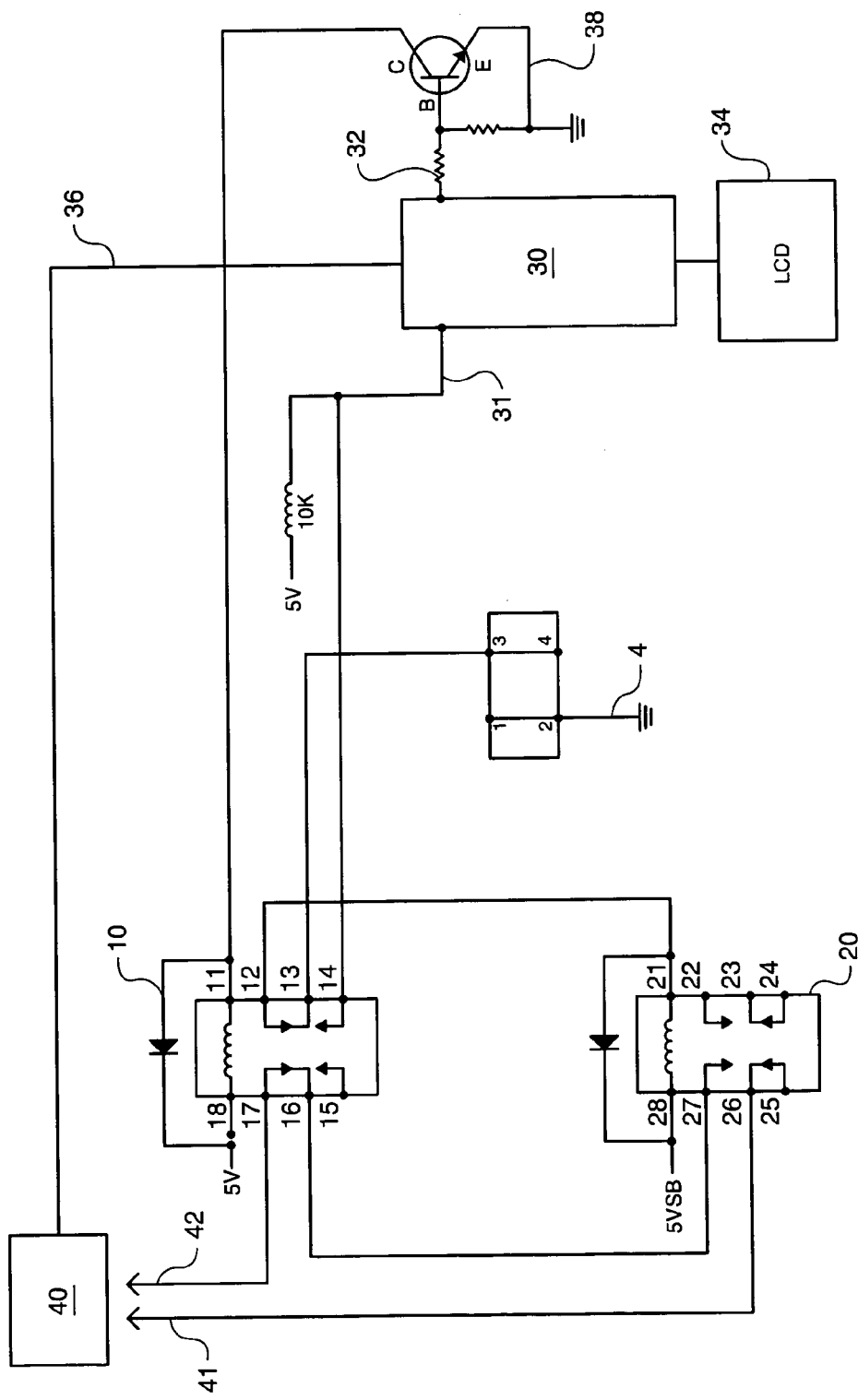

FIG. 1 shows the circuit of the present invention in a first, deactivated state. Switch 4 is in operative communication with relay 10 at terminal 13. Terminal 13 is closed in its connection with terminal 12. Terminal 12 connects with second, power relay 20 at terminal 21. As will be apparent to those of skill of the art, depression of switch 4 will connect terminal 21 of the power up relay 20 to ground, thereby activating the second relay 20 (with the standby 5 volt power). Relay 20 is configured to break the circuit between motherboard terminals 41 and 42 by switching terminal 26 from its closed connection with terminal 27 to a connection with open terminal 25. Thus, having established an open circuit, the depressed button 4 presents the motherboard terminals 41 and 42 with the open circuit required for activating its preconfigured power on process. FIG. 2 shows the same circuit in its state when the button 4 is depressed originally from a deactivated state for the device, creating the open circuit.

Operation of button or switch 4 includes both depressing it and releasing it. When the operator releases switch 4, terminal 26 returns to its closed position with terminal 27, again completing the circuit across motherboard terminals 41 and 42. To allow for further operation, the circuit must be opened a second time, before the defined time period passes. Accordingly, the firmware in processor 30, upon proper operating voltages having been established, signals the transistor 38 to activate, which energizes relay 10 and opens the circuit to terminals 41 and 42. Thereby, the preconfigured motherboard power up sequence is executed in full, and this is sufficient to turn on the device being controlled.

Figure 3:
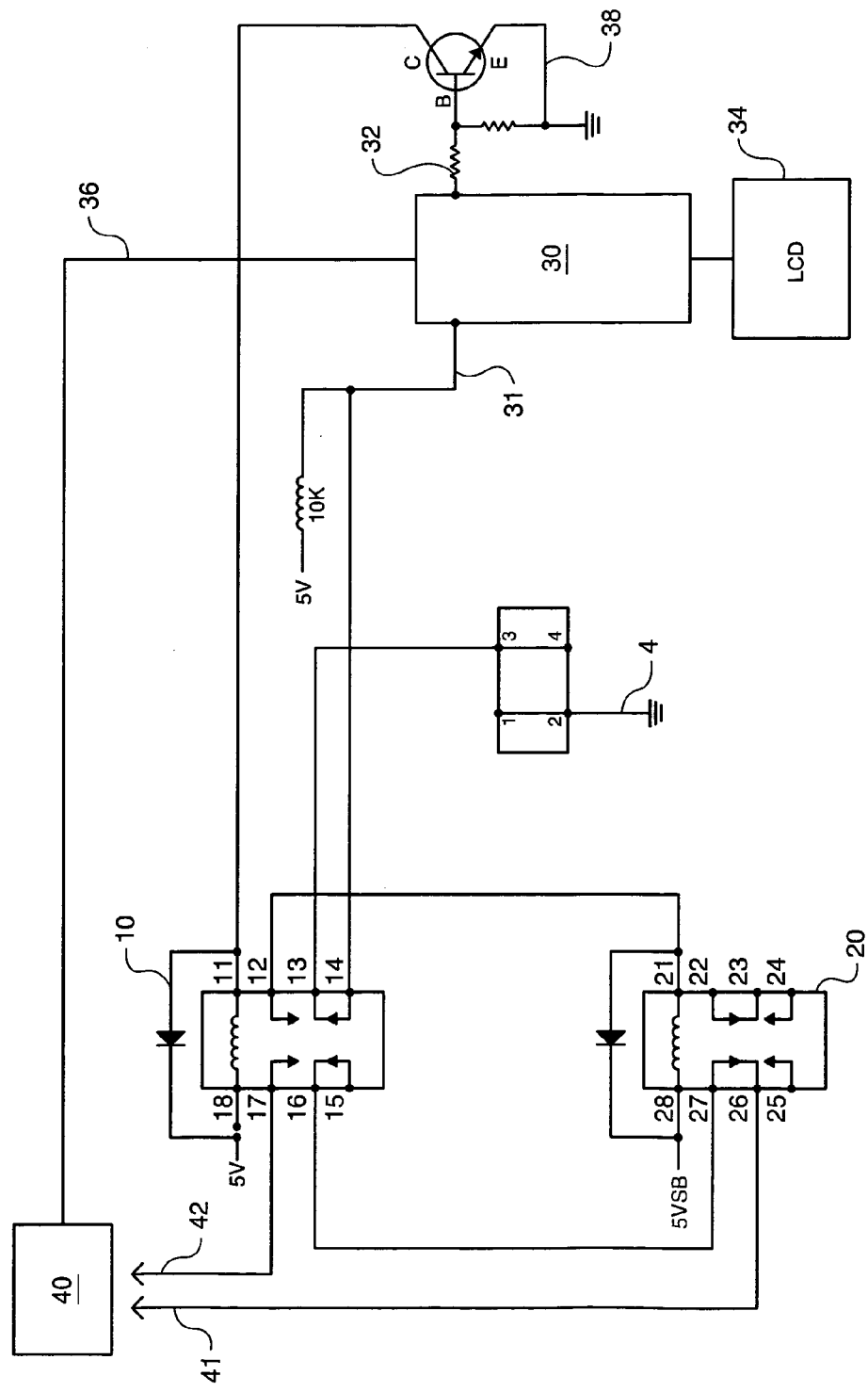

At this point, energized control relay 10 switches the connection of terminal 13 from contact with terminal 12 to contact with terminal 14. Terminal 14 is directly wired to processor 30 through entry terminal 31. Thus, push button or switch 4 is put in line with processor 30. FIG. 3 shows the circuit of the present invention in this "on," operating state.

During operation, microprocessor 30 is programmed to control a user interface panel and a menu of control options displayable to the user, as for example on LCD 34 in the depicted embodiment. A button, mouse, or other known operator interface device may be used by an operator to navigate a series of screens and a series of menus at least some of which have multiple menu items for selection, and all of which are controlled by processor 30. When a menu selection is indicated, again according to known software control and other means, button 4 is pressed to select or enter the indicated menu item. Through the connection of button 4 with microprocessor 30 that is maintained by first relay 10, the microprocessor 30 will receive the enter signal selecting the menu item indicated, and microprocessor 30 will forward that instruction to the motherboard 40 via circuit 36 for execution.

Energizing first, control relay 10 also turns terminal 16 from its connection with terminal 17 to a connection with open terminal 15. Accordingly, first relay 10 is disconnected from a power on or power off circuit while it maintains the selection entry circuit between switch 4 and microprocessor 30.

According to the method of the present invention, shut down is a multi step task. Creating a multi step task prevents accidental shut down by inadvertently pressing button 4. The multi step shut down of the present invention requires navigating to a menu that includes a menu item for powering down. When microprocessor 30 displays this menu item on display 34, button 4 is used in its capacity as an enter button to select the power down. According to the software method depicted below, microprocessor 30 signals from terminal 32 that transistor 38 should be deactivated and signal through its connection at terminal 11 that relay 10 be deactivated and returned to its inactive configuration. Terminal 16 reconnects with terminal 17 closing and maintaining a closed circuit between motherboard terminals 41 and 42, prompting shut down after the allotted time, 4 seconds, has passed. Terminal 13 returns to its connection with terminal 12, and through it returns to its connection with the power up relay 20. In alternative embodiments considered to be within the scope of the present invention, mother board software may control transistor 38, or software or processor firmware may otherwise control relay 10 to open and close its circuit.

Figure 4:
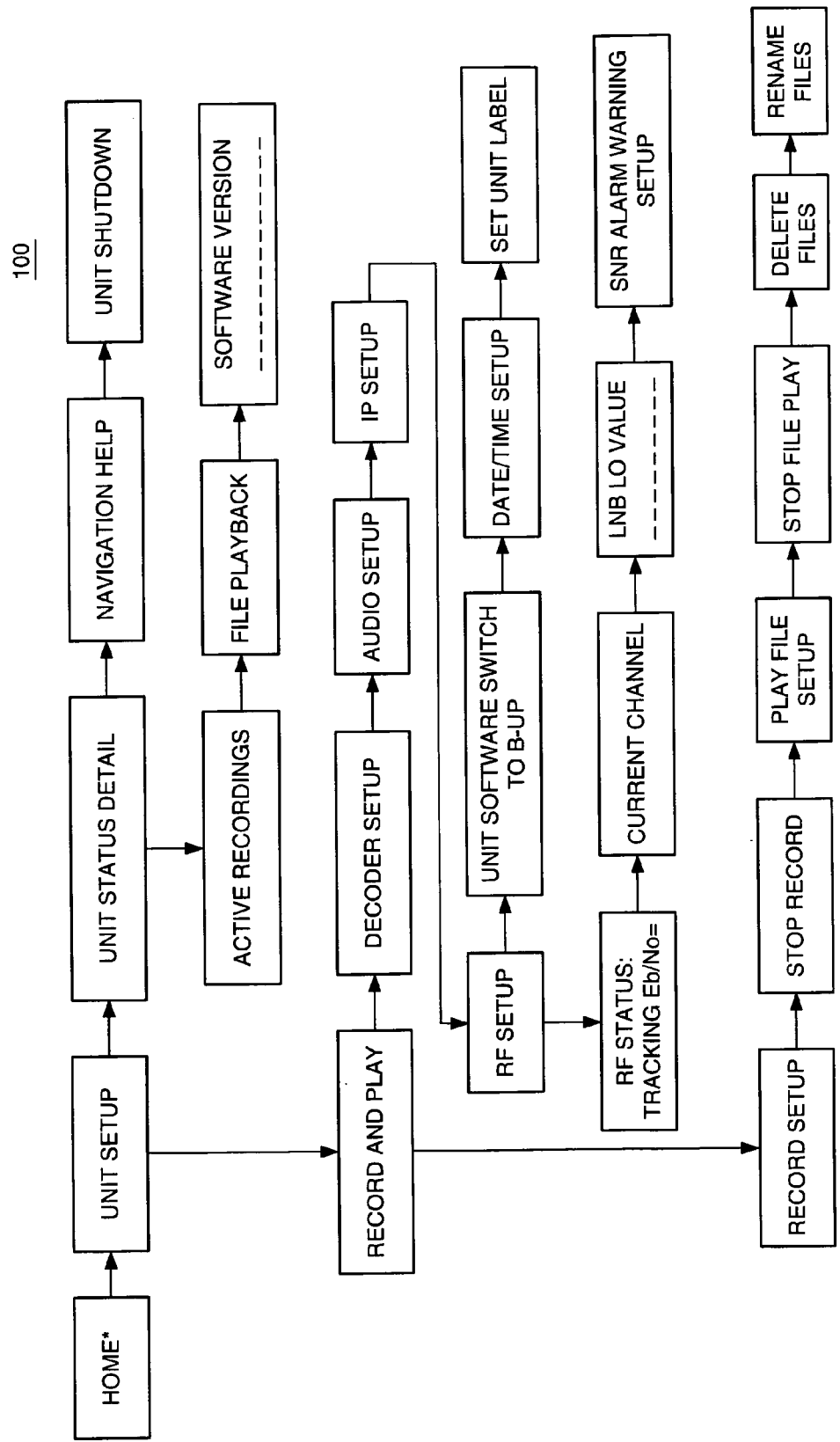
FIG. 4 is a menu tree.

FIG. 4 depicts one possible menu tree for an operator interface display as controlled by processor 30. As is apparent, a number of screens must be navigated before reaching the "unit shutdown" of option 100. When this option is displayed and enter is pressed, the software controls powering down the entire device. Optionally, an additional step may be added by configuring the software to display and a confirmation screen, for example, asking "Are you sure?".

Software control of energizing or powering on a device, module, relay or other hardware associated with a motherboard are known to those skilled in the art. Accordingly, software control of the procedure at power on for energizing relay 10 is not shown.

Figure 5:
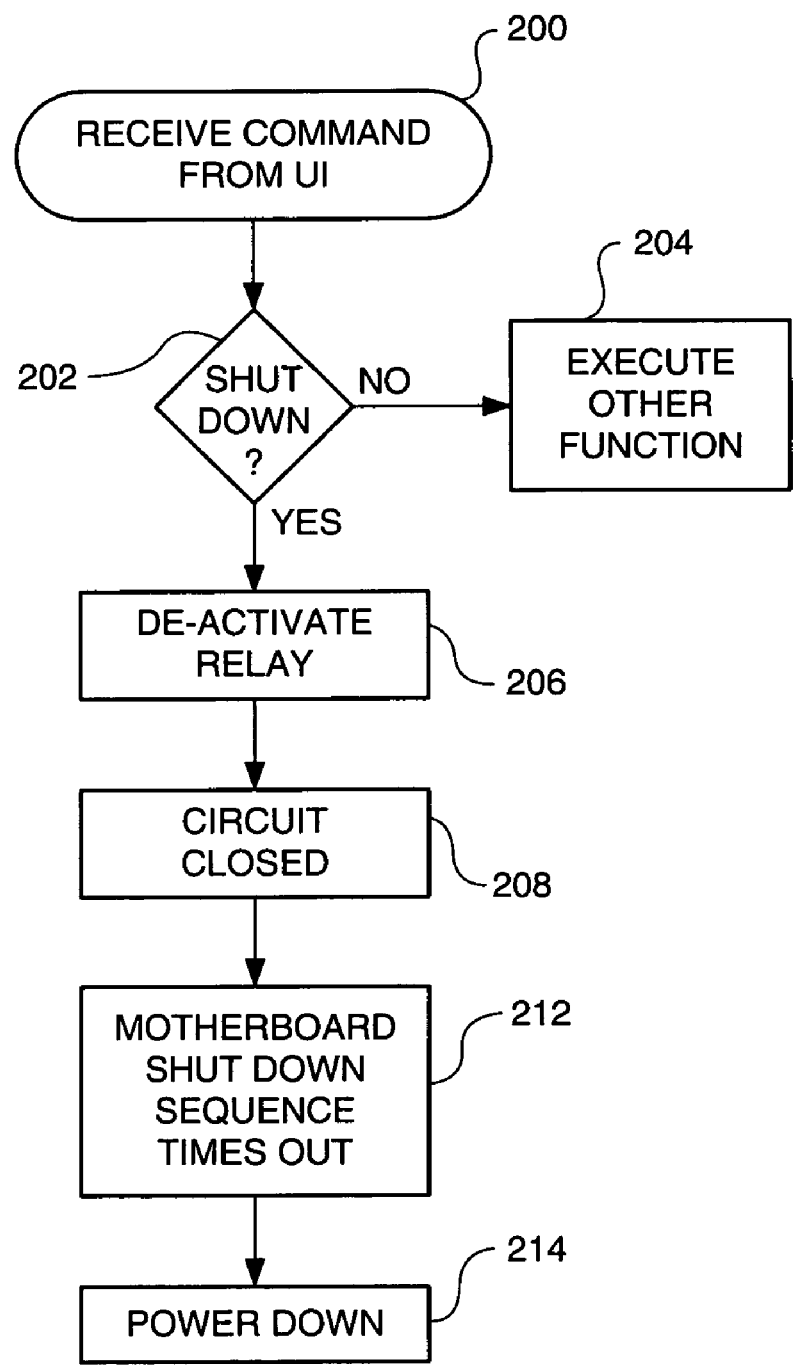
FIG. 5 is a flow chart depicting software shut down control.

FIG. 5 is a flow chart depicting software controlled execution of the multi step power down procedure. The procedure begins when a menu command is received from the graphical user interface via circuit 36 from processor 30. The menu command received by the motherboard when a user presses the button in its enter stage is received 200 from processor 30 by circuit 36. The software checks for shut down instruction 202. If the received command is not a shut down instruction, the software proceeds to execute whatever function has been selected 204. If the command received was a shut down request, the software sends a shut down command to the firmware in processor 30. Processor 30 then deactivates transistor 38, which deactivates control relay 10 at step 206. The motherboard terminals 41 and 42 are thereby closed 208. After the terminals are closed, the power down sequence times out at step 212 and final power down occurs and the device as a whole turns off at step 214.

Figure 6:
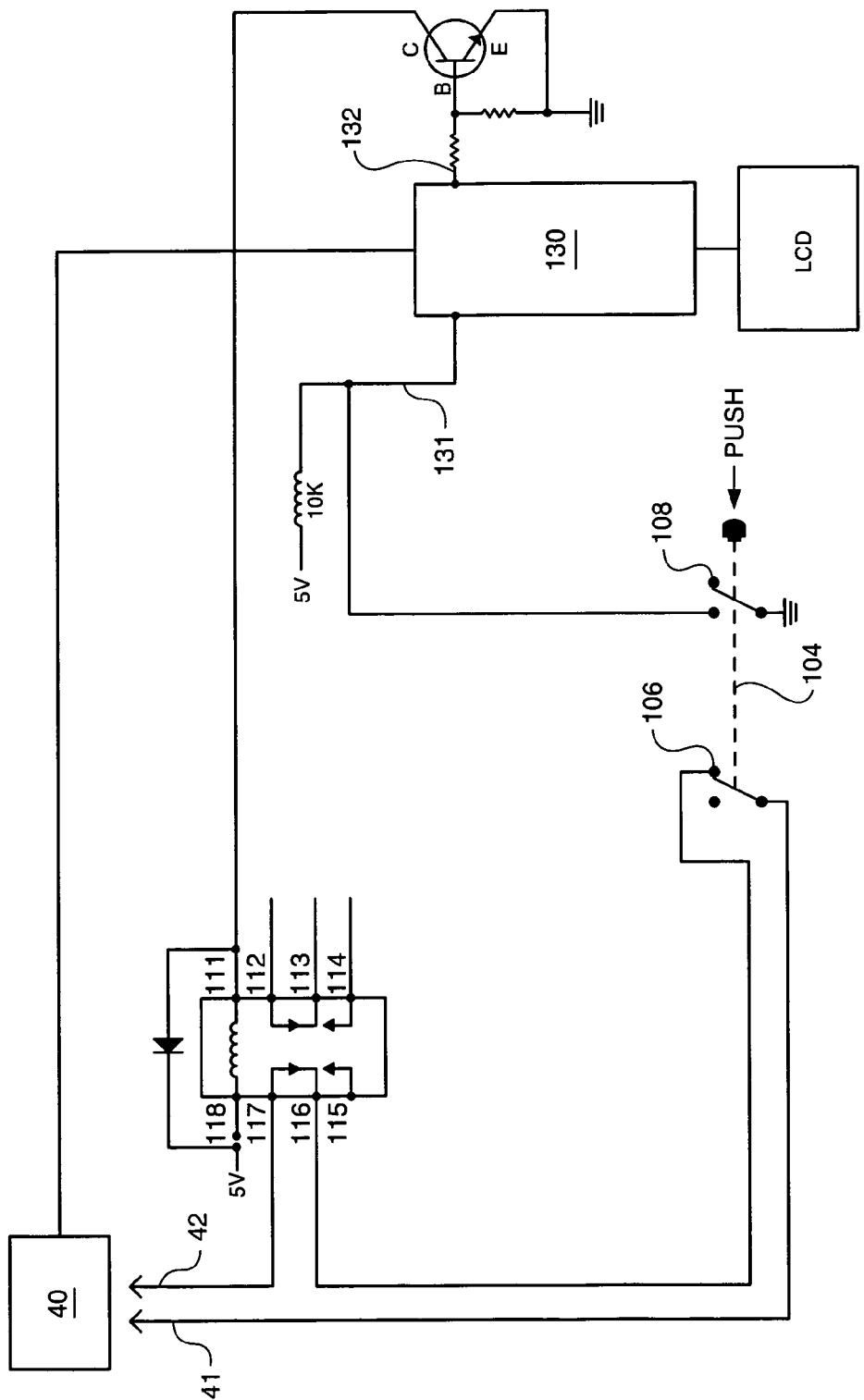
FIG. 6 is a circuit diagram for an alternative apparatus.

FIG. 6 depicts an alternative embodiment. Switch 104 has two poles. One pole 106 opens the connection of terminals 141 and 142, "priming" the motherboard for its power up sequence. The other pole 108 signals processor 130 that the device is being turned on. The button 104 is released, closing the circuit again. The signal to processor 130 that the device is being turned on prompts the activation of transistor 138 to switch terminal 116 from terminal 117 (closed circuit) to terminal 115 (open circuit). Optionally, processor 130's firmware may be programmed with an appropriate wait for transistor activation. Accordingly, the motherboard's terminals 141 and 142 are primed by opening when the button is depressed, see a closure when the button is released, and then see that the circuit is re-opened by the transistor and relay within the preconfigured time frame.

Thereafter, in the "on" state, the button simply connects with the processor 130 as a simple enter button, until shut down is selected. The repeated openings of pole 106 while the unit is on are irrelevant because the circuit is open between terminals 116 and 117 anyway.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

We claim:

1. A protected power switch for an integrated receiver/decoder comprising:
    a first relay adapted for operative communication with a motherboard;
    a second relay adapted for operative communication with a motherboard, and in operative communication with said first relay;
    a switch in operative communication with said first relay;
    a processor in operative communication with said first relay;
    whereby, when a device is off, said switch is configured to activate said first and second relay to power up the device, and when said device is on, said first relay connects said switch to operatively communicate with said processor as an enter switch.

2. The protected power switch of claim 1 wherein said switch may power off said device by entering a power off menu item displayed by said processor.

3. The protected power switch of claim 1 wherein said first relay and said second relay are solid state.

4. A dual purpose power/entry switch for a device such as an integrated receiver/decoder comprising;
    a first relay having a first position connecting a switch to a second relay and having a second position connecting said switch to a processor, said first relay being in said first position when said device is off and being in said second position when said device is on;
    said second relay being adapted to operatively communicate with a motherboard and being in operative communication with said switch such that when said first relay is in said first position, pressing said switch signals a power up for said device through said second relay; and
    said processor being configured to receive signals from said switch as collections of indicated menu items controlled by said processor when said first relay is in said second position.

5. The dual purpose power/entry switch of claim 4 further comprising a power down menu item that may be selected by said switch to turn off said device.

6. The dual purpose power/entry switch of claim 4 wherein said first relay and said second relay are solid state.

7. A method of controlling power to an integrated receiver/decoder comprising:
    completing a circuit with a push button to power up;
    opening said circuit with a transistor controlled by a processor to continue operation of said device, said processor being in operative communication with said push button and with said transistor;
    entering with said push button a menu item displayed by said processor to power down.

8. An apparatus for power control of a device having a motherboard configured to power up on momentary closure of a circuit and to operate with said circuit open and to power down upon closure of said circuit, comprising;
    a button in operative communication with said circuit such that operating said button when said device is off closes said circuit;
    a processor in operative communication with said button such that when said button is operated when said device is off, said processor activates a transistor to open said circuit at a preconfigured time;
    said processor being further configured to present a plurality of menu choices to a user, said menu choices being selectable by a connection established between said button and said processor when said device is on; and
    one of said menu choices being a power down choice, said power down choice being selectable by operation of said button and said processor being configured to deactivate said transistor to close said circuit when said power down choice is selected.

9. The apparatus of claim 8 wherein said circuit is closed when said device is off.

10. The apparatus of claim 9 wherein operation of said button first opens then closes said circuit.

11. The apparatus of claim 8 wherein said operative communication between said button, said processor and said circuit is solid state.

12. The apparatus of claim 8 wherein said operative communication between said button, said processor and said circuit is via at least two relays.

13. The apparatus of the preceding claim wherein said operative communication between said button and said processor and said circuit is via a single relay.

14. The apparatus of the preceding claim wherein said button is a two pole button.

15. The apparatus of claim 8 wherein said circuit is closed for power down via firmware control in said processor.

16. The apparatus of claim 8 wherein said circuit is closed for power down via software control in said motherboard.

* * * * *